July 15, 1969  R. H. MOHRMAN  3,455,362
FLOATING NUT ASSEMBLY AND MOUNTING MEANS THEREFOR
Filed April 17, 1967
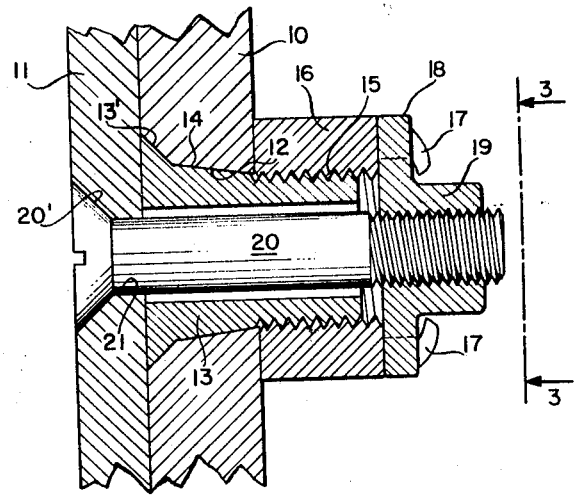
FIG_1
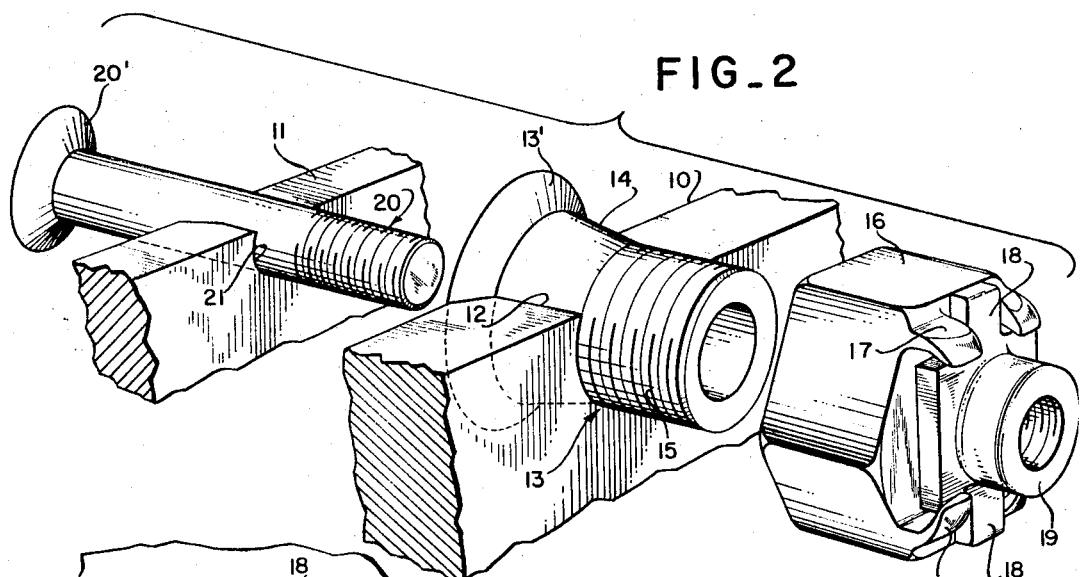
FIG_2
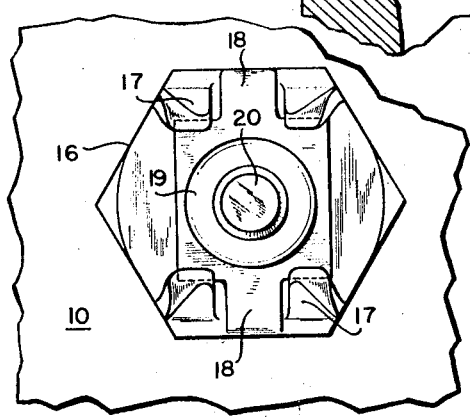
FIG_3
*INVENTOR.*
ROBERT H. MOHRMAN
BY *George C. Sullivan*
Agent

United States Patent Office 3,455,362
Patented July 15, 1969

3,455,362
FLOATING NUT ASSEMBLY AND MOUNTING MEANS THEREFOR
Robert H. Mohrman, Mableton, Ga., assignor to Lockheed Aircraft Corporation, Burbank, Calif.
Filed Apr. 17, 1967, Ser. No. 631,458
Int. Cl. F16b 39/00
U.S. Cl. 151—41.7                           2 Claims

ABSTRACT OF THE DISCLOSURE

An assembly of a nut within a nut is provided in which one nut serves as a base to attach the assembly to the threaded end of a hollow bushing or other mounting member. The other nut is retained in the base nut and can float to provide relative movement between the two and receive a screw which passes through the hollow bushing. The float provides for clearance in the hole around the screw.

---

This invention relates to floating nuts as employed in various fasteners to ensure alignment with respect to the axis of coacting bolts adapted to be threaded therein, and more particularly to a floating nut assembly including mounting means therefor whereby it becomes for all intents and purposes an integral part of a supporting structure for an associated member removably connected thereby.

Floating nuts are usually employed in inaccessible or "blind" applications, being secured to the hidden or blind side of a supporting structure adjacent an aperture therein through which the coacting bolt passes. Alignment of the threaded hole in the nut with the coacting bolt is thereby facilitated, and the nut is held against rotation as the bolt is tightened. In many applications, however, the associated supporting structure is not capable of mounting the floating nut in the conventional manner, such as by rivets or the like. One example of this would be a situation where the supporting structure is of marginal integrity as is typical in aircraft applications where primary structures such as wing spars and the like are designed to close size and strength tolerances in order to minimize weight. In order to attach or mount another member to it, such a supporting structure must be enlarged or reinforced, and often this is objectionable or even impossible without substantial redesign. At the same time, the attached or mounted member imposes an additional load on the supporting structure, resulting in added stress concentrations therein. In such critical situations, all such forces and loads are ideally applied uniformly on the supporting structure over a relatively large area in the vicinity of the connector.

The present invention is, therefore, directed primarily to a novel floating nut especially adapted to be immovably secured to a supporting structure with its threaded aperture generally in axial alignment with the bolt passage without in any way weakening the associated part of the supporting structure. As a matter of fact, when installed the floating nut assembly herein contemplated has the effect of substantially enhancing the integrity of the supporting structure. At the same time, installation of this floating nut assembly is such that all forces and loads imposed on the supporting structure by the associated member when attached thereto are distributed uniformly over a relatively large area of the supporting structure.

To the above ends, the nut assembly herein proposed is formed by a primary nut and a secondary nut mounted for substantially universal lateral movement on one end of the primary nut. Thus disposed, the threaded apertures of the primary and secondary nuts are capable of coaxial alignment and at all times located in at least partial overlapping relation, with the aperture in the secondary nut being smaller in diameter than that in the primary nut.

The nut assembly as above described is adapted to receive an externally threaded, hollow or tubular mounting element threadably secured in the aperture of the primary nut. A threaded bolt passing through the mounting element is adapted to coact with the secondary nut. The shank of this bolt has a diameter that is less than that of the mounting element to permit its alignment with the aperture in the secondary nut regardless of its axial position. The universal movement or floating capability of the secondary nut permits the coaxial location of the inner bolt and nut which, when fully tightened, clampingly secures the connected members with the applied forces being transferred across the mounting element. The mounting element is press fitted in the aperture provided therefor in the supporting structure so as to constitute in effect an integral part thereof and also produce radial compressive stresses and a circumferential tensile stress therein to effect a connection of maximum structural integrity.

The present nut assembly offers the additional advantage that both the mounting element and the inner bolt are inserted from the accessible side so that installation in extremely tight quarters is possible. Thus, when an obstruction exists on the hidden or blind side of the supporting member, only sufficient room to locate the nut assembly in place is necessary since tightening of the inner bolt in the secondary nut draws the nut assembly into the ultimate position.

With the above and other objects in view as will be apparent, this invention consists in the construction, combination, and arrangement of parts all as hereinafter more fully described, claimed, and illustrated in the accompanying drawings wherein:

FIGURE 1 is a longitudinal section taken through a floating nut assembly constructed in accordance with the teachings hereof and the structures or panels interconnected thereby to show a typical, ultimate installation;

FIGURE 2 is an exploded isometric view of the same arrangement shown in FIGURE 1; and FIGURE 3 is an end view thereof taken along line 3—3 of FIGURE 1.

Referring more particularly to the drawings, 10 designates a supporting structure which for present purposes may be considered simply as a wall or bulkhead on which a member or panel 11 is to be mounted. To this end, the bulkhead 10 is pierced by an aperture 12 of a predetermined size in diameter smaller than the outside diameter of a bushing 13 adapted to be press fitted therein. Preferably, the surface of the bushing 13 is tapered adjacent its head or outer end as at 14 to facilitate the uniform press or interference fit thereof in the aperture 12. The head of the bushing 13 may be countersunk as at 13' whereby its outer face lies flush with the associated surface of the bulkhead 10 when ultimately mounted therein.

At its other or inner end, the bushing 13 is threaded as at 15 externally for coaction with a nut 16. To this end, the threaded end 15 of the bushing 13 has a uniform diameter, and installation of the bushing 13 in the bulkhead 10 may be accomplished by tightening it in the nut 16, forcibly drawing it into its ultimate snug and immovable position.

At its outer end, the nut 16 is formed or otherwise provided with retainer tabs 17 adapted to receive and enclose a flange 18 internally formed on and projecting from a secondary nut 19. The nut 19 is thereby mounted for substantially universal lateral movement, but held against substantially all rotational and linear movement. The aperture in the secondary nut 19 is smaller in diameter than the aperture in nut 16, being threaded for coaction with the shank of a bolt 20. The diameter of the bolt 20 is a predetermined amount less than the diameter of the passage through bushing 13 whereby the bolt 20 is free to move radially therein for axial alignment with the aperture in the secondary nut 19. The panel 11 is pierced by an opening 21 for passage therethrough of the bolt 20 and the mounting of the panel 11 on the bulkhead 10 so as to form in effect a unitary structure. If desired, the head of the bolt 20 may be countersunk as at 20′ in the adjacent surface of the panel 11.

Thus assembled, the structure results in the application of a uniform radial force on the bulkhead 10 applied through the interference fit of bushing 13 which acts as a mounting element for the nut assembly 16–19. The clamping engagement of the panel 11 against the surface of bulkhead 10 applies the forces thereof through the bushing 13 whereby the nut 16 and the panel 11 act in opposition to each other across a relatively large area of the panel 11. At the same time, the panel 11 thus mounted on the bulkhead 10 is readily removable and replaceable thereon through the bolt 20.

While shown and described in what is believed to be the most practical and preferred form or embodiment, it is apparent that departures from this specific structure will suggest themselves to those skilled in the art and may be made without departing from the spirit and scope of the invention.

What is claimed is:

1. The combination with a hollow mounting element having a tapered, external surface adjacent one of its ends complemental to, for flush abutment with, the correspondingly tapered, internal surface defining an aperture piercing a supporting structure and terminating at its other end in external threads, said external surface being not longer than said internal surface so as not to extend beyond the supporting structure at each end thereof when in flush abutment as aforesaid and having an outside diameter a predetermined amount greater than that of said internal surface for interference fit therewith, of a floating nut assembly adapted to coact with said mounting element comprising a primary nut having an internally threaded aperture complemental to, and having an effective length greater than, said external threads so as to dispose said primary nut against said supporting structure and the threaded end of said mounting element within the plane of the outer end of said primary nut, and a secondary nut mounted for limited, substantially universal movement on the outer end of said primary nut and having an internally threaded aperture therein smaller than said primary nut internally threaded aperture, said primary and secondary nut apertures being at least partially overlapped at all times and capable of coaxial alignment.

2. The combination of claim 1 wherein the end of said mounting element remote from said primary nut is countersunk in said supporting structure.

References Cited

UNITED STATES PATENTS

| | | | |
|---|---|---|---|
| 2,986,244 | 5/1961 | Hutchison | 85—1 |
| 3,020,947 | 2/1962 | McKelvey | 151—41.75 |
| 3,141,488 | 7/1964 | Wootton | 151—41.7 |

EDWARD C. ALLEN, Primary Examiner